United States Patent
Ohmura

Patent Number: 5,579,343
Date of Patent: Nov. 26, 1996

[54] SOFT DECISION CIRCUIT

[75] Inventor: Hideo Ohmura, Tokyo, Japan

[73] Assignee: NEC Corporation, Tokyo, Japan

[21] Appl. No.: 418,420

[22] Filed: Apr. 7, 1995

[30] Foreign Application Priority Data

May 31, 1994 [JP] Japan ................................ 6-118111

[51] Int. Cl.$^6$ ........................... H04L 27/06; H04L 27/22; H04L 1/02

[52] U.S. Cl. ........................ 375/341; 375/347; 375/332; 455/137; 329/304

[58] Field of Search .................... 375/279, 280, 375/281, 329, 332, 340, 261, 267, 347, 261, 341; 455/132, 137; 329/304; 371/43

[56] References Cited

U.S. PATENT DOCUMENTS

| | | | |
|---|---|---|---|
| 5,109,392 | 4/1992 | McDonald | 375/347 |
| 5,127,025 | 6/1992 | Okanoue | 375/347 |
| 5,203,023 | 4/1993 | Saito et al. | 375/347 |
| 5,265,122 | 11/1993 | Rasky et al. | 455/137 |

OTHER PUBLICATIONS

"Digitization Technique for Mobile Communication", Triceps, 1990, p. 158.

*Primary Examiner*—Tesfaldet Bocure
*Attorney, Agent, or Firm*—Sughrue Mion, Zinn, Macpeak & Seas

[57] ABSTRACT

An object of the present invention is to provide a soft decision circuit by which the reception accuracy can be improved. Each of first and second receivers of the soft decision circuit includes a phase amount detector for detecting a phase amount of a receive signal, an I table and a Q table for converting the phase amount into orthogonal I/Q signals, an A/D converter for converting a receive level signal of the receive signal into a digital value, a log linear table for converting an output of the A/D converter into a squared value of a true value, and first and second multipliers for multiplying outputs of the I table and the Q table with the output of the log linear table to weight the outputs of the I table and the Q table. The soft decision circuit further comprises first and second adders for adding outputs of the first and second multipliers of the receivers of the 0-system and the 1-system, respectively, and a digital signal processing circuit for performing determination using outputs of the adders as soft decision information.

4 Claims, 1 Drawing Sheet

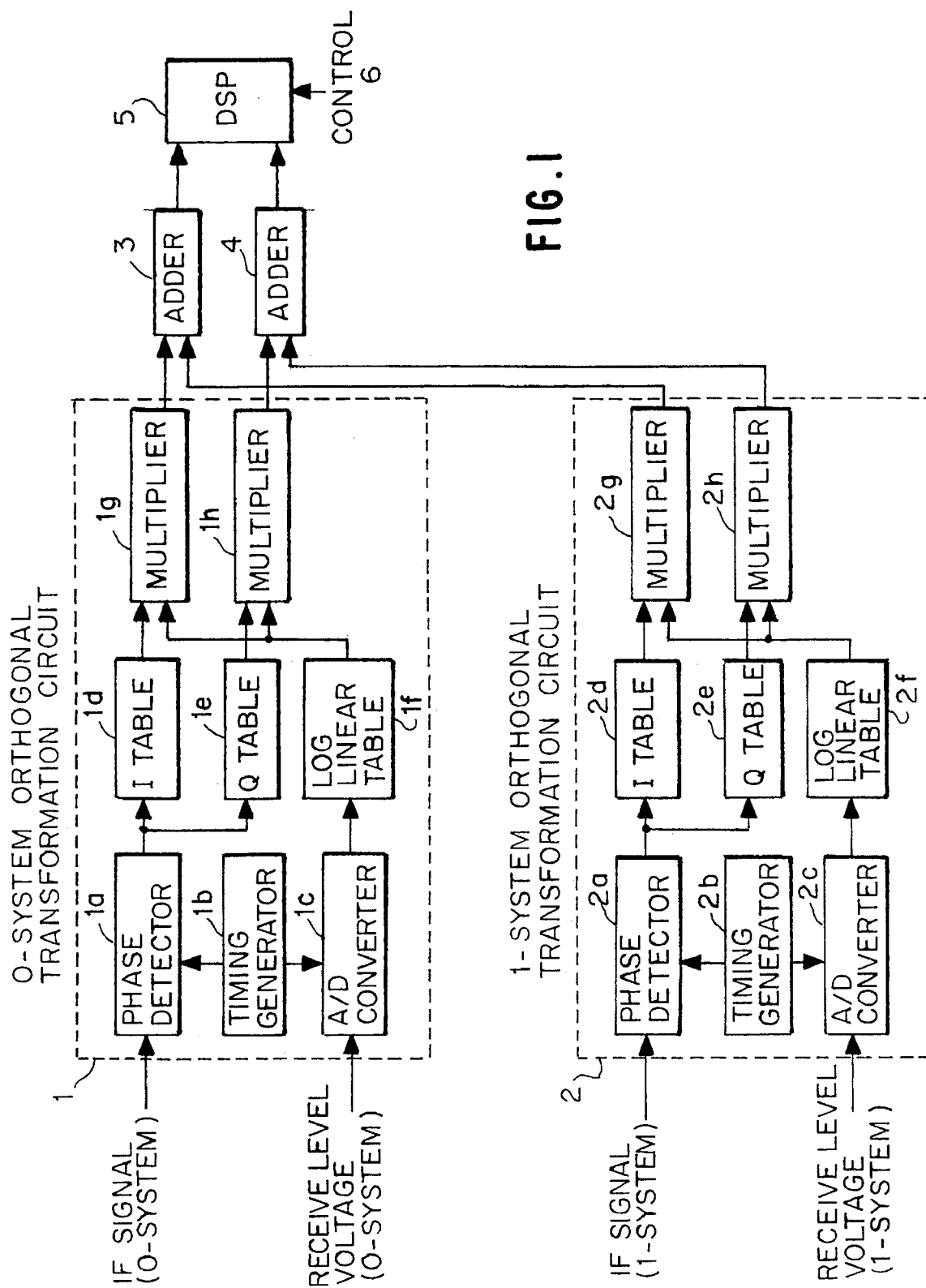

SOFT DECISION CIRCUIT

BACKGROUND OF THE INVENTION

1. Field of the Invention

This invention relates to a soft decision circuit provided in a receiver for receiving a modulated wave modulated by four-phase PSK, and more particularly to a soft decision circuit which codes a received wave at a stage following an intermediate frequency (IF) stage of a receiver using maximum ratio synthetic diversity reception.

2. Description of the Related Art

In radio communications, error correction is performed to assure a sufficient transmission quality. As an error correction code, a BCH code or a convolution code is employed, and among convolution codes, a viterbi decoding method which has a high correction capacity is used frequently.

In a viterbi decoding method, a soft decision circuit which performs soft decision to obtain a higher coding gain is used. In the soft decision circuit, a receive level signal or a determination error upon decoding is used as reliability information (refer to, for example, "Digitization Technique for Mobile Communications", Triceps, 1990, p. 158).

In the conventional soft decision circuit described above, a receive level signal or a determination error upon decoding is employed as reliability information. When a receiver performs diversity reception in order to reduce a bad influence of multi-path fading, rainfall attenuation or the like, if selective diversity reception change over to one of a plurality of receive signals having different characteristics, then a receive level signal or a determination error of a selected system may be employed as reliability information. However, if maximum ratio synthetic diversity reception which has a good noise characteristic is performed, then a receive level signal after synthesized from a plurality of signals must be used as reliability information. To this end, complicated calculations must be performed using software. Accordingly, the conventional soft decision circuit has a problem in that much time is required for the processing and consequently the circuit cannot actually be used as a practical circuit. Further, depending upon a transmission line characteristic, error correction based on hard decision is not always sufficiently effective, and the conventional soft decision circuit has another problem in that, if soft decision is used where the transmission line characteristic is such as just described above, much processing time is required.

SUMMARY OF THE INVENTION

The present invention has been made in view of the problems of the prior art described above, and it is an object of the present invention to provide a soft decision circuit which can achieve coding having a good noise characteristic and having a high correction capacity and hence can achieve improvement in reception accuracy by employing maximum ratio synthetic diversity reception in the soft decision circuit.

According to an aspect of the present invention, there is provided a soft decision circuit wherein a four-phase PSK modulated signal is received by diversity reception using a first receiver of a 0-system and a second receiver of a 1-system and soft decision to improve an error rate of the receive signal is based on outputs of the two receivers, characterized in that each of the first and second receivers includes:

a phase amount detector for detecting a phase amount of an IF signal of the receive signal;

an I table and a Q table for converting the phase amount detected by the phase amount detector into orthogonal I/Q signals;

an A/D converter for converting a receive level signal of the receive signal into a digital value;

a log linear table for converting an output of the A/D converter into a squared value of a true value;

a first multiplier for multiplying an output of the I table with an output of the log linear table to weight the output of the I table; and a second multiplier for multiplying an output of the Q table with the output of the log linear table to weight the output of the Q table; and the soft decision circuit comprises:

a first adder for adding an output of the first multiplier of the receiver of the 0-system and an output of the first multiplier of the receiver of the 1-system;

a second adder for adding an output of the second multiplier of the receiver of the 0-system and an output of the second multiplier of the receiver of the 1-system; and a digital signal processing circuit for performing determination using an output of the adder and an output of the second adder as soft decision information.

According to another aspect of the present invention, there is provided a soft decision circuit wherein a four-phase PSK modulated signal is received by diversity reception using a first receiver of a 0-system and a second receiver of a 1-system and soft decision to improve an error rate of the receive signal is based on outputs of the two receivers, characterized in that each of the first and second receivers includes:

a phase variation amount detector for detecting a phase variation amount of an IF signal of the receive signal;

an I table and a Q table for converting the phase variation amount detected by the phase variation amount detector into orthogonal I/Q signals;

an A/D Converter for converting a receive level signal of the receive signal into a digital value;

a log linear table for converting an output of the A/D converter into a squared value of a true value;

a first multiplier for multiplying an output of the I table with an output of the log linear table to weight the output of the I table; and a second multiplier for multiplying an output of the Q table with the output of the log linear table to weight the output of the Q table; and the soft decision circuit comprises:

a first adder for adding an output of the first multiplier of the receiver of the 0-system and an output of the first multiplier of the receiver of the 1-system;

a second adder for adding an output of the second multiplier of the receiver of the 0-system and an output of the second multiplier of the receiver of the 1-system; and a digital signal processing circuit for performing determination using an output of the adder and an output of the second adder as soft decision information.

In the soft decision circuits of the present invention having the constructions described above, amplitude information obtained by maximum ratio synthesis, by means of the adders, of phase amounts (or phase variation amounts) detected by the receiver of the 0-system and the receiver of the 1-system and orthogonal I/Q signals obtained by coordinate transformation of a receive level signal is used as reliability information upon error correction to perform soft decision.

BRIEF DESCRIPTION OF THE DRAWING

FIG. 1 is a block diagram of an embodiment of the present invention.

DETAILED DESCRIPTION OF THE PREFERRED EMBODIMENT

An embodiment of the present invention is described below with reference to the drawings.

FIG. 1 is a block diagram showing the construction of an embodiment of the present invention.

The present embodiment has the construction of a soft decision circuit which is provided at a stage following an IF stage in a receiver which decodes a four-phase PSK signal by viterbi decoding. In the present embodiment, a receive signal is received by maximum ratio synthetic diversity reception, and the present embodiment includes 0-system orthogonal transformation circuit 1, 1-system orthogonal transformation circuit 2, adders 3 and 4, and digital signal processing circuit (DSP) 5 for inputting the outputs of adders 3 and 4.

0-system orthogonal transformation circuit 1 (and 1-system orthogonal transformation circuit 2) includes phase amount detector 1a (2a) and A/D converter 1c (2c) for inputting an IF signal and a receive level voltage, respectively, of the 0-system (1-system), timing generator 1b (2b) for outputting output timing signals to phase amount detector 1a (2a) and A/D converter 1c (2c), I table 1d (2d) and Q table 1e (2e) for inputting the output of phase amount detector 1a (2a), log linear table 1f (2f) for inputting the output of A/D converter 1c (2c), multiplier 1g (2g) for inputting the output of I table 1d (2d) and the output of log linear table 1f (2f) and multiplying the thus inputted values, and multiplier 1h (2h) for inputting the output of Q table 1e (2e) and the output of log linear table 1f (2f) and multiplying the thus inputted values.

Adder 3 inputs the outputs of multiplier 1g in 0-system orthogonal transformation circuit 1 and multiplier 2g in 1-system orthogonal transformation circuit 2, adds the inputted values and outputs a sum of them to DSP 5. Adder 4 inputs the outputs of multiplier 1h in 0-system orthogonal transformation circuit 1 and multiplier 2h in 1-system orthogonal transformation circuit 2, adds the input values and outputs a sum of them to DSP 5.

Receive signal processing operation of the present embodiment is described below.

Phase amount detector 1a detects the phase amount of an IF signal of the 0 system, and I table 1d converts the phase amount detected by phase amount detector 1a into an I component. Q table 1e converts the phase amount detected by phase amount detector 1a into a Q component.

A/D converter 1c converts a receive level voltage of the 0 system into a digital value. Log linear table 1f is provided in order to complete reliability information to be used in soft decision and converts the receive level voltage digitized by A/D converter 1c by logarithm conversion to obtain a squared value of the true value. Reception timing generator 1b generates, once for each one symbol, a timing signal for fetching the receive IF signal at an optimum reception position into phase amount detector 1a and A/D converter 1c.

Multiplier 1g multiplies the I component outputted from I table 1d by the squared value of the true value of the receive level voltage outputted from log linear table 1f to weight the I component. Similarly, multiplier 1h multiplies the Q component outputted from Q table 1e by the squared value of the true value of the receive level voltage outputted from log linear table 1f to weight the Q component.

Also 1-system orthogonal transformation circuit 2 operates quite similarly to 0-system orthogonal transformation circuit 1. Adder 3 adds the I component of the 0-system weighted by multiplier 1g and the I component of the 1-system weighted by multiplier 2g, and adder 4 adds the Q component of the 0-system weighted by multiplier 1h and the Q component of the 1-system weighted by multiplier 2h.

DSP 5 inputs soft decision information, which is the result of adder 3 and adder 4, by way of a data bus. The soft decision information inputted to DSP 5 includes reliability information, and soft decision error correction can be performed also using the reliability information of the soft decision information. Or, hard decision error correction can be performed by using only a code bit of the thus obtained soft decision information. DSP 5 is constructed so that it executes one of the determinations in response to a control signal 6 and outputs a result of the determination.

It is to be noted that phase detectors 1a and 2a in the embodiment described above may be replaced by phase variation amount detectors for detecting a phase variation amount. Also in this instance, soft decision similar to that performed by the embodiment described above can be performed.

Since the present invention is constructed in such a manner as described above, the following effects are anticipated.

Orthogonal I/Q signals can be obtained only by coordinate conversion from a polar coordinate into an orthogonal coordinate using the phase of an IF signal and a receive level voltage, and any of the soft decision circuits can be realized from a simple circuit;

since production of soft decision information is performed all by hardware, high speed operation and low power dissipation can be achieved;

reliable error correction can be performed for a transmission line error by combining soft decision error correction with maximum ratio synthetic diversity reception;

and change-over of soft decision/hard decision can be performed flexibly in accordance with a transmission line characteristic, and unnecessary processing is prevented from being performed and processing can be reduced.

What is claimed is:

1. A soft decision circuit wherein a four-phase PSK modulated signal is received by diversity reception using a first receiver of a 0-system and a second receiver of a 1-system and soft decision to improve an error rate of the receive signal is based on outputs of the two receivers, characterized in that each of said first and second receivers includes:

a phase amount detector for detecting a phase amount of an IF signal of the receive signal;

an I table and a Q table for converting the phase amount detected by said phase amount detector into orthogonal I/Q signals;

an A/D converter for converting a receive level signal of the receive signal into a digital value;

a log linear table for converting an output of said A/D converter into a squared value of a true value;

a first multiplier for multiplying an output of said I table with an output of said log linear table to weight the output of said I table; and a second multiplier for multiplying an output of said Q table with the output of said log linear table to weight the output of said Q table; and said soft decision circuit comprises:

a first adder for adding an output of said first multiplier of said receiver of said 0-system and an output of said first multiplier of said receiver of said 1-system;

a second adder for adding an output of said second multiplier of said receiver of said 0-system and an output of said second multiplier of said receiver of said 1-system; and a digital signal processing circuit for performing determination using an output of said first adder and an output of said second adder as soft decision information.

2. A soft decision circuit wherein a four-phase PSK modulated signal is received by diversity reception using a first receiver of a 0-system and a second receiver of a 1-system and soft decision to improve an error rate of the receive signal is based on outputs of the two receivers, characterized in that each of said first and second receivers includes:

a phase variation amount detector for detecting a phase variation amount of an IF signal of the receive signal;

an I table and a Q table for converting the phase variation amount detected by said phase variation amount detector into orthogonal I/Q signals;

an A/D converter for converting a receive level signal of the receive signal into a digital value;

a log linear table for converting an output of said A/D converter into a squared value of a true value;

a first multiplier for multiplying an output of said I table with an output of said log linear table to weight the output of said I table; and a second multiplier for multiplying an output of said Q table with the output of said log linear table to weight the output of said Q table; and said soft decision circuit comprises:

a first adder for adding an output of said first multiplier of said receiver of said 0-system and an output of said first multiplier of said receiver of said 1-system;

a second adder for adding an output of said second multiplier of said receiver of said 0-system and an output of said second multiplier of said receiver of said 1-system; and a digital signal processing circuit for performing determination using an output of said first adder and an output of said second adder as soft decision information.

3. A soft decision circuit as claimed in claim 1, characterized in that said digital signal processing circuit performs soft decision or hard decision based on the output of said first adder and the output of said second adder in response to a control signal from the outside.

4. A soft decision circuit as claimed in claim 2, characterized in that said digital signal processing circuit performs soft decision or hard decision based on the output of said first adder and the output of said second adder in response to a control signal from the outside.

* * * * *